Figure 1:
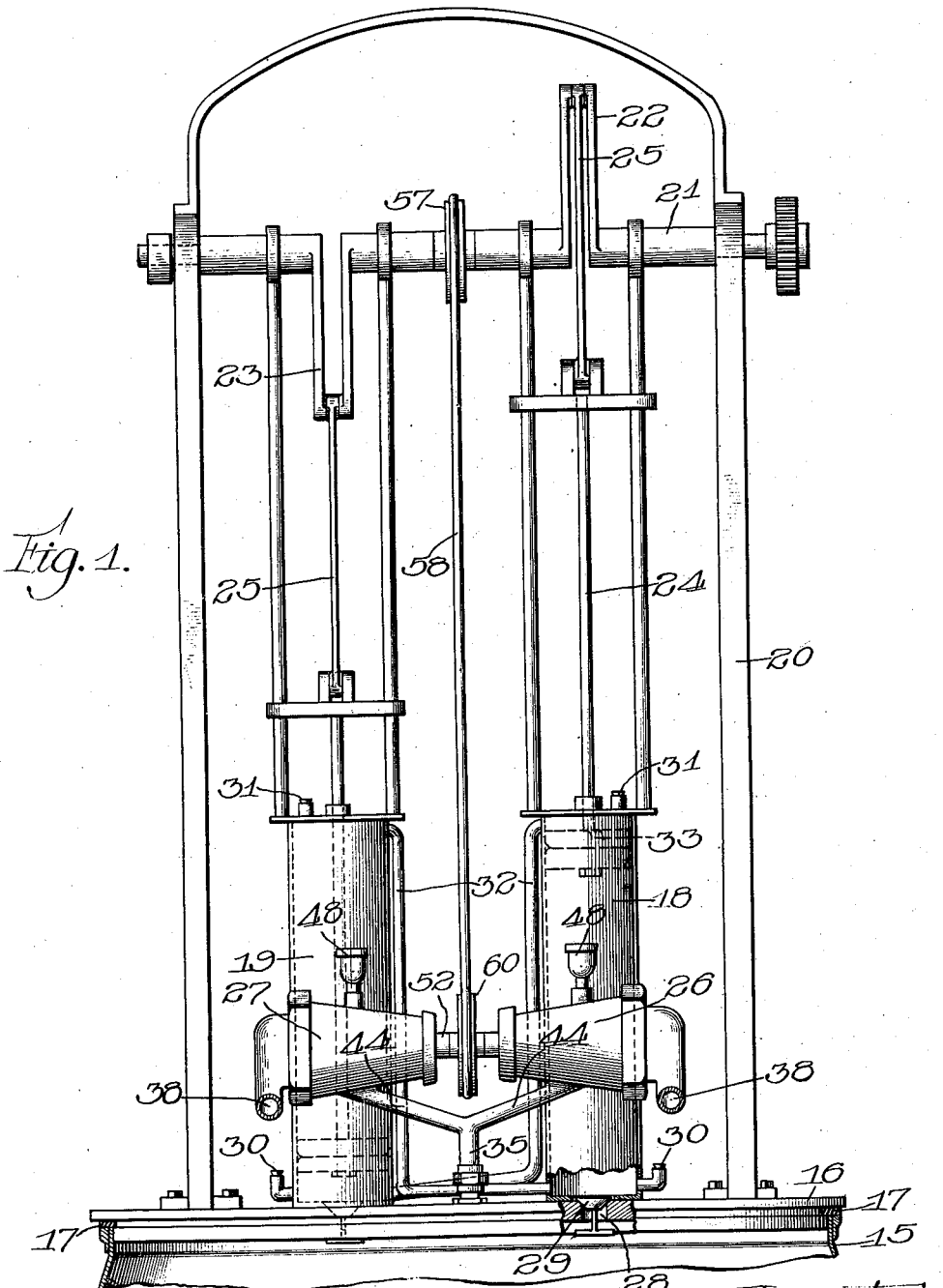

T. UMRATH.
MILKING MACHINE.
APPLICATION FILED DEC. 19, 1908.

1,010,204.

Patented Nov. 28, 1911.
5 SHEETS—SHEET 1.

T. UMRATH.
MILKING MACHINE.
APPLICATION FILED DEC. 19, 1908.
1,010,204.
Patented Nov. 28, 1911.
5 SHEETS—SHEET 2.
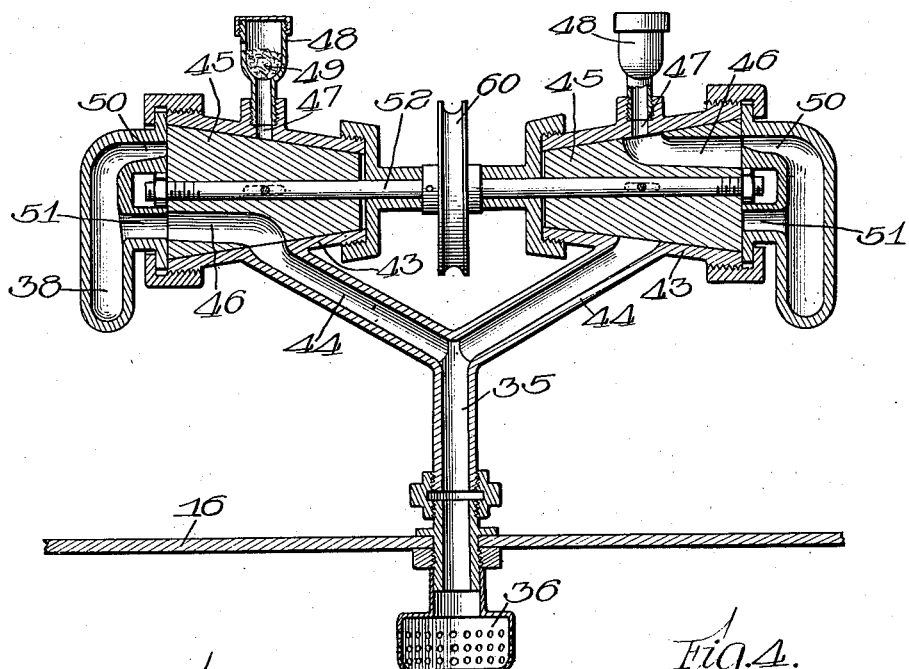
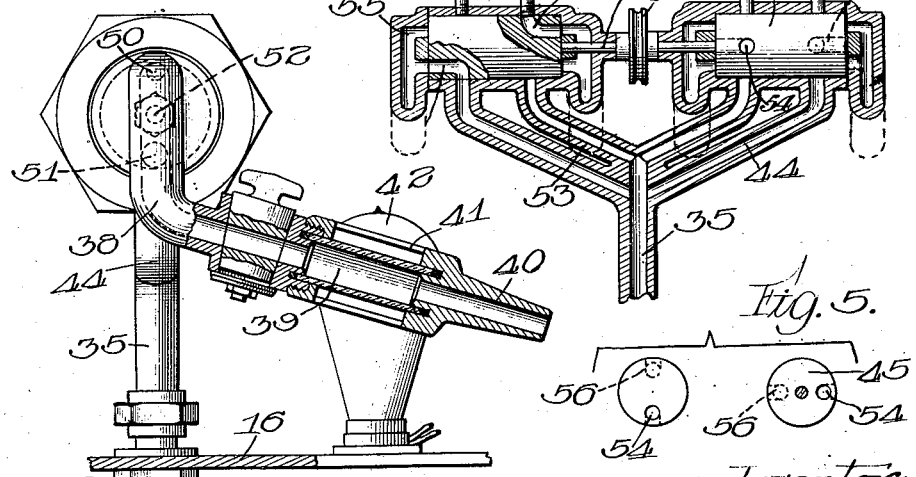
Witnesses:
M. R. Rochford.
C. L. Hopkins
Inventor:
Theodore Umrath,
by Jones, Addington & Ames, Attys.

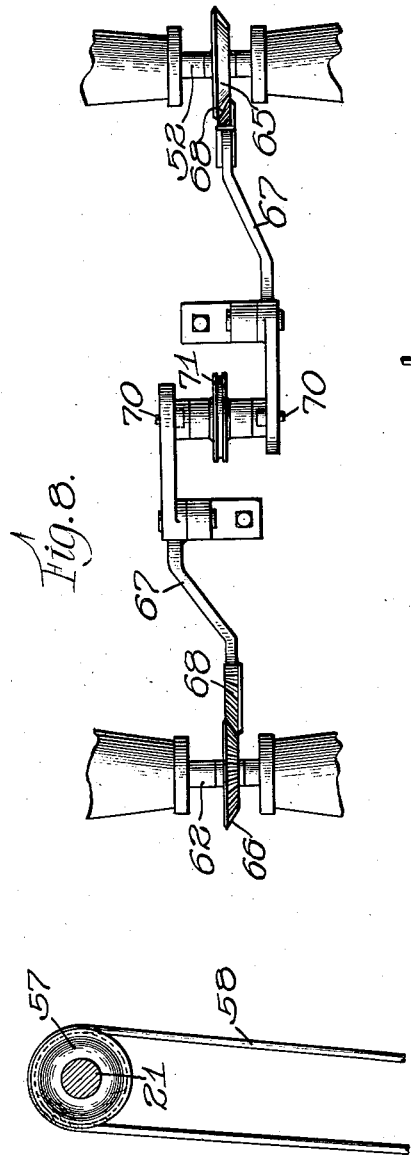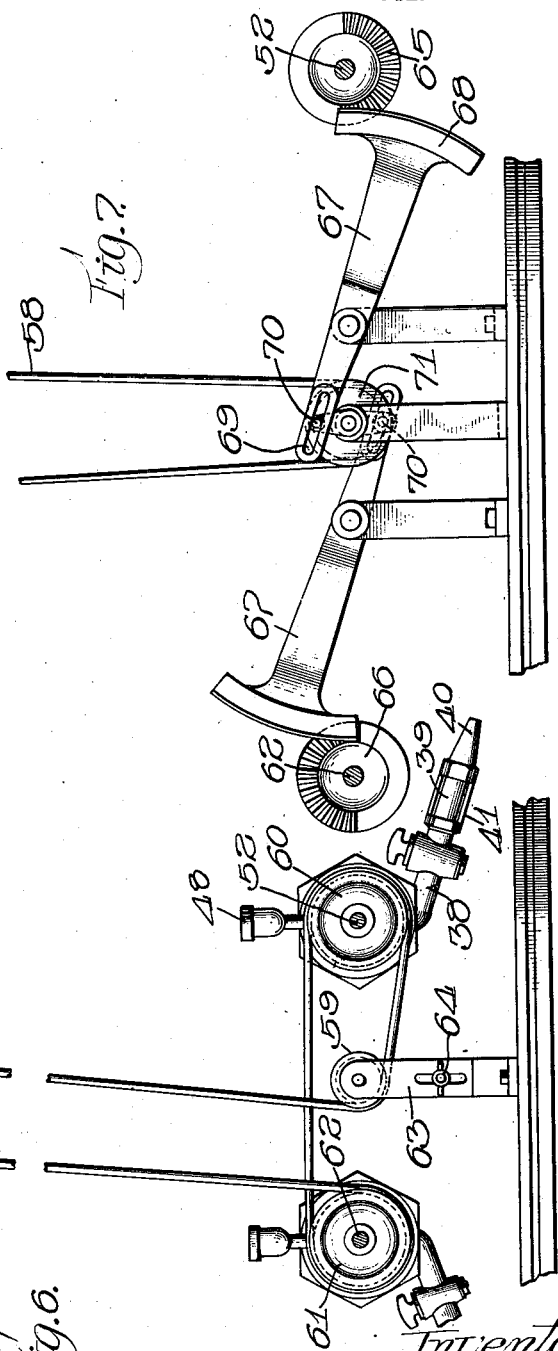

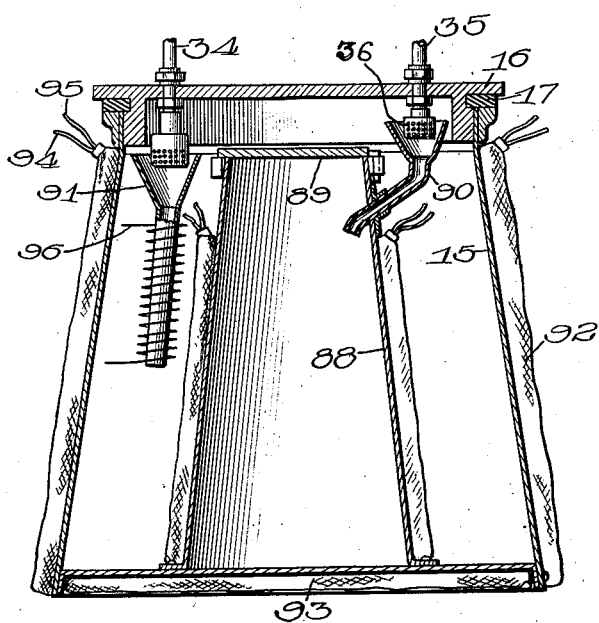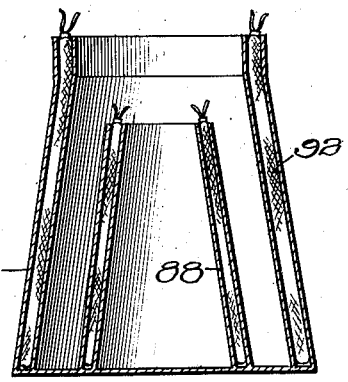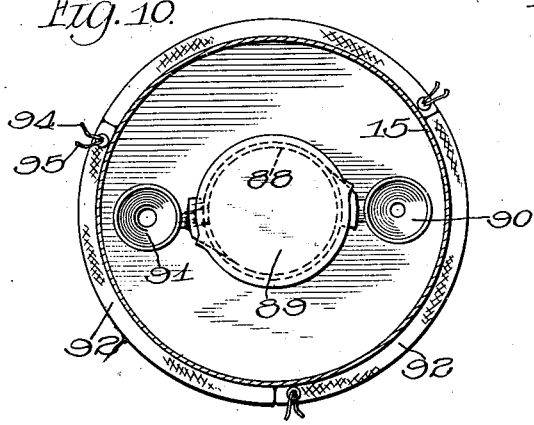

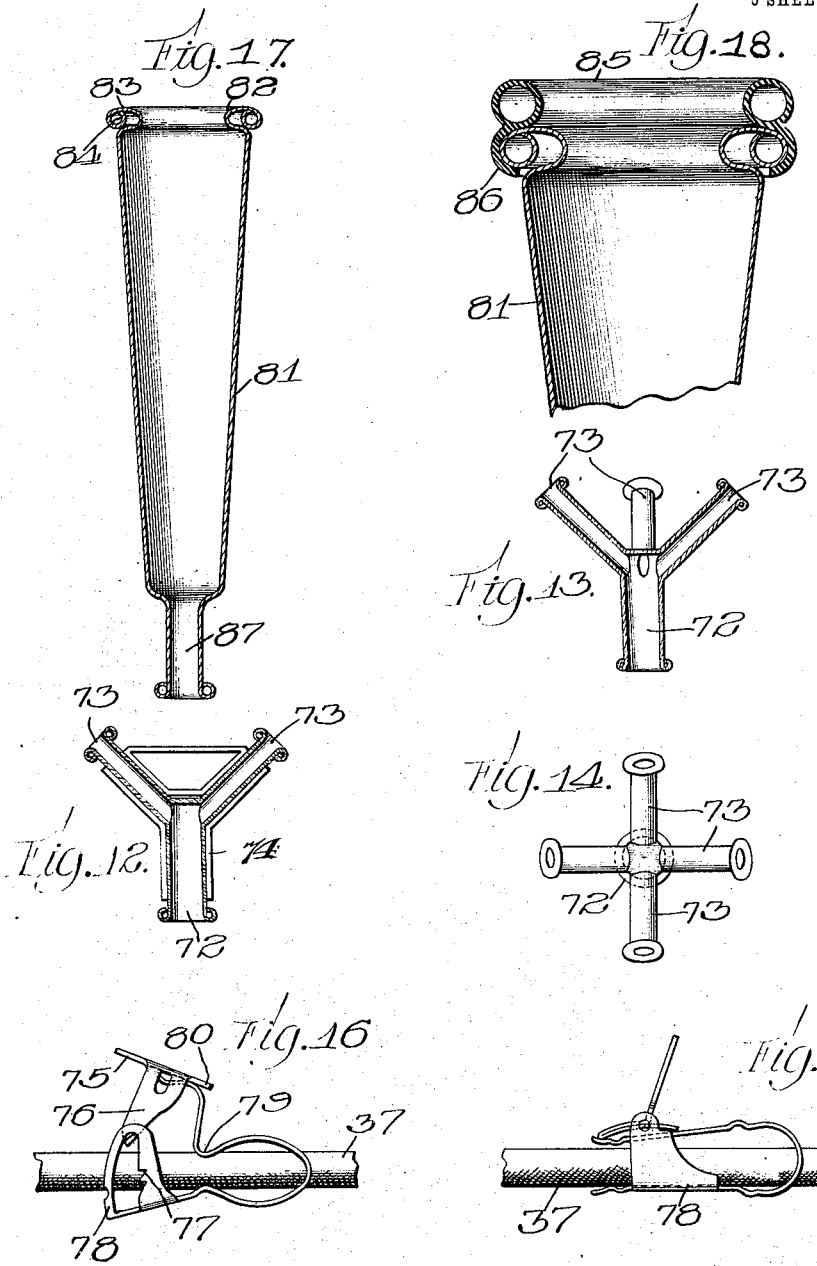

UNITED STATES PATENT OFFICE.

THEODORE UMRATH, OF CHICAGO, ILLINOIS, ASSIGNOR TO LIBERTY COW MILKER COMPANY, OF HAMMOND, INDIANA, A CORPORATION OF INDIANA.

MILKING-MACHINE.

1,010,204.  Specification of Letters Patent.  Patented Nov. 28, 1911.

Application filed December 19, 1908. Serial No. 468,304.

*To all whom it may concern:*

Be it known that I, THEODORE UMRATH, a citizen of the United States, residing at Chicago, in the county of Cook and State of Illinois, have invented new and useful Improvements in Milking-Machines, of which the following is a full, clear, concise, and exact description, reference being had to the accompanying drawing, forming a part of this specification.

This invention relates to improvements in milking machines, the object of the invention being the improvement of machines of this type.

In an application filed by me June 27, 1908, Serial No. 440,609, I have shown a milking machine having the main features of the machine shown in the present application, the present invention being in the nature of improvements in said machine.

In the accompanying drawings—Figure 1 is a side elevational view of a portion of the machine, showing particularly the form of pumps now used and one pair of an improved type of pulsator; Fig. 2 is a vertical sectional view through the pair of pulsators shown in Fig. 1; Fig. 3 shows one of the pulsators in side elevation and the milk duct leading therefrom in longitudinal section, this figure showing also means for lighting a portion of the milk duct, which is made transparent to afford a view of the milk passing therethrough in order that it may be determined whether or not the milk is flowing; Fig. 4 is a view similar to Fig. 2 but showing a modified form of pulsation producing means, whereby a different effect in the operation of milking is obtained, as will be explained hereinafter; Fig. 5 shows diagrammatically the positions of certain passages in the valve piece of the pulsation device illustrated in Fig. 4 when the moving parts are in the positions illustrated in said figure; Fig. 6 shows, in elevation, means for operating the pulsators by rotary movement; Fig. 7 shows, in elevation, means for operating said pulsators by imparting thereto an oscillating movement; Fig. 8 is a plan view of the parts shown in Fig. 7; Fig. 9 shows, in central vertical section, an improved form of milk receptacle adapted to keep the milk obtained from two cows separated, in order to afford means for keeping individual records of the two cows milked by the machine, this figure showing also means for pasteurizing or sterilizing the milk by the application of heat derived from electric heating devices; Fig. 10 is a plan view of the receptacle with the cover and parts carried thereby removed; Fig. 11 shows, in vertical section, a modification of the receptacle; Figs. 12, 13 and 14 illustrate various forms of transparent coupling pieces which are employed in connecting the parts of the flexible milking tubes together; Figs. 15 and 16 show forms of devices which are applied to the flexible tubes whereby one or more of said tubes may be individually closed, if desired; and Figs. 17 and 18 show improved forms of teat cups.

In the several figures of the drawings, in which like reference numerals indicate the same parts throughout, 15 is the receptacle, upon which is mounted a cover 16 carrying a ring 17 of rubber or other suitable material for making an air-tight connection between the upper edge of the receptacle and the cover when the latter is in position. Upon the cover 16 is mounted a pair of double-acting air pumps 18 and 19, arranged to exhaust the receptacle, and a frame 20 in which is mounted a shaft 21 having cranks 22 and 23. These cranks operate connecting rods 24 and 25 for moving the pistons of the pumps 18 and 19. Mounted also upon the cover are two pairs of pulsators, one pair being shown in Fig. 1 and designated 26 and 27, respectively. These pulsators 26 and 27 are operatively connected to the crank shaft 21 so that when the crank shaft is revolved (by means not shown) the pulsators will be operated from said shaft.

In the milking machine shown and described in my earlier application hereinabove mentioned the pumps were of the single acting type, while in the machine illustrated in the present application these pumps have been modified so as to cause them to exert an exhausting effect upon both the upward and downward strokes of the piston in each cylinder. The lower end of each cylinder communicates through a port 28 with the interior of the receptacle, this port being covered by a valve 29 which permits the flow of air from the receptacle to the cylinder but prevents the flow in the opposite direction. At the lower end of each cylinder is provided a valve 30 which closes in the direction to prevent the flow of air into the cylinder but opens to permit the exit of air from said cylinder. A similar valve 31 is arranged in the upper end of each cylinder. The upper part of each cylinder is connected by means of a pipe 32 with the lower end of the other cylinder. By the use of this type or pump an exhausting effect is obtained upon the movement of the pistons 33 in either direction, the advantage of this being that I am enabled to reduce the size of the pumps and at the same time increase the amount of vacuum obtained in the receptacle.

A pair of pipes 34 and 35 open on the under side of the cover and lead each to a pair of pulsators. These pipes are provided upon their lower ends within the receptacle with suitable filters 36 for screening out dirt and the like. These filters consist of perforated cups having their upper edge drawn in to form necks, screw-threaded to engage screw-threads on the ends of the pipes 34 and 35. Leading from each pulsator is a milk duct, to which is connected a flexible tube 37 extending to the cow. Each duct comprises a member 38 and a glass sight-tube 39 secured to the end thereof and provided with a nipple 40 adapted for the attachment of the flexible tube. The sight-tube 39 is properly protected by guard wires 41 to prevent accidental breakage of the same, and by the inspection of this tube during the operation of milking it may be readily determined whether or not the milk is flowing therethrough. In order that this may be observed in dark stables I mount upon the machine, preferably on the cover, a small electric lamp 42 which is supplied with current from the leads which bring current to a motor (not shown) with which the machine is provided for operating the crank shaft.

Experience has shown that if the sight-tube be arranged in a horizontal position, as was the case with the machine illustrated in my earlier application above referred to, a certain quantity of milk will remain in the sight-tube during the intervals between successive tractive effects. Even after the milk had been completely extracted from the teat or teats to which the milking tube led the sight-tube would sometimes contain milk, rendering it difficult to determine when the milking tube should be closed and detached from the animal. I now arrange the sight-tube to extend in a direction at an angle with the horizontal, either vertical or inclined, as preferred, experience showing that the latter position is satisfactory. This improvement renders it possible to ascertain at a glance whether or not the machine is working properly, and enables the operator to determine when the milk has been all extracted from the teat or teats to which the milking tube leads.

The pulsators are arranged to make and break communication between the partly exhausted receptacle and the flexible tubes, and make and break connection between said tubes and the atmosphere, these operations being so timed that when communication between the tube and the receptacle is made the communication between the tube and the atmosphere is broken, and when communication between the atmosphere and the tube is made communication between the tube and the receptacle is broken. The effect of this upon the animal is that the suction exerted in the tube is intermittent and during the periods between successive tractive effects the tube is opened to the atmosphere and air is permitted to flow in to reduce the vacuum, whereby a pulsating effect simulating that given by a calf in the operation of extracting the milk is obtained. The pulsators may be operated either by rotating the valve pieces of the same or by oscillating said valve pieces through an arc of 180 degrees, and I have shown means for effecting either of these operations, as may be preferred. Each pulsator comprises a casing 43 having a tube 44 leading therefrom to the pipe 35 which extends through the cover 16 of the receptacle. In the chamber within each of these pulsator casings is a rotary or oscillatory valve piece 45.

In the form of pulsator shown in Fig. 2 the valve piece 45 is provided with a passage 46 which opens at one of its ends through the side of the valve piece and at its opposite end through the end of said valve piece. The relief port 47 is arranged at the side of the casing in position to register with the passage 46 when the valve piece is moved to the proper position. A cup 48, containing a quantity of filter material 49, is inserted into the relief port 47 to screen out dust and the like. The part 38 is provided with two openings 50 and 51 with which the passage 46 in the valve piece alternately registers as the valve piece is oscillated or revolved. The valve pieces of the pair of pulsators on one side of the machine are connected together by a shaft 52, and suitable means are provided for operatively connecting this shaft with the crank shaft or main shaft of the machine. When the shaft 52 and the valve pieces carried thereby are in the positions shown in Fig. 2 the passage 46 of one valve piece effects communication between the pipe 44 and the milk duct, whereby the vacuum within the receptacle is permitted to act through the flexible tube leading from the milk duct and thus draw milk in through said duct and the pipe 44. During the period in which communication is thus effected between this milk duct and the receptacle the other milk duct is put in communication with the relief port, this being effected by the passage 46 of the corresponding valve piece registering at one end with the milk duct and at its opposite end with the relief port. When using the style of pulsator shown in Fig. 2 there occurs in the two milk ducts on one side of the machine a pulsating tractive effect which alternates from one of these ducts to the other. The tube leading from each milk duct may be divided by means of a form of connection illustrated in Fig. 12. In this case the flexible tube leading from each pulsator divides into two tubes, each of which has at its end a teat cup, and thus the tractive effect is exerted upon two teats at a time, alternating from one pair to the other. When it is desired to milk the four teats in succession a form of pulsator shown in Fig. 4 may be employed, this pulsator having four passages, each of which has means similar to the nipple 40 shown in Fig. 3 for the attachment of a flexible tube. In this form of pulsator the pipe 35 branches into two passages 44, as in the other form of pulsator, and two other passages 53 also lead into the pipe 35. Each valve piece in this case is provided with a passage 54 arranged to connect the passage 55, leading to one nipple, alternately with the relief port 47 and the passage 44 which leads to the receptacle through the pipe 35. This valve piece has also a second passage 56 which connects a milk duct on the opposite side alternately with the atmosphere and with the passage 53. The valve pieces 45 are so placed upon the shaft 52 that a plane passing through the two passages in one valve piece extends at a right angle with the plane passing through the two passages of the other valve piece. By so disposing the valve pieces on the shaft the action is made such that a tractive effect is exerted upon the four milking tubes in succession, so that suction is never exerted upon more than one teat at a time.

The means for operating the pulsators from the crank shaft are illustrated in Figs. 6, 7 and 8, Fig. 6 showing connections whereby rotary movement is given the valve pieces, and Figs. 7 and 8 showing means whereby these valve pieces are made to oscillate.

Referring first to the form shown in Fig. 6, a pulley 57 is arranged on the crank shaft 21, and over this pulley runs a belt 58 which is led under an idler pulley 59 and drives two pulleys 60 and 61, one of these pulleys being arranged upon each pulsator shaft 52 and 62. The idler pulley is arranged upon a telescoping standard 63 having a set screw 64 to retain the same in position after the pulley has been adjusted to take up slack in the belt.

In the form of pulsator drive mechanism shown in Figs. 7 and 8 the pulleys on the shafts 52 and 62 are replaced by gears 65 and 66. Meshing with each of these gears is a lever 67 having one end thereof formed as a sector gear 68 and the opposite end formed with a slot 69 extending longitudinally thereof. In this slot run wrist-pins 70, projecting from opposite sides of a pulley 71 which is driven by the belt 58. As the pulley 71 is revolved the wrist-pins slide in the slots 69 and the levers are oscillated, the sector gears carried thereby imparting an oscillating movement to the gears 65 and 66 and the valve pieces of the pulsators, and moving the same through substantially a half revolution.

Heretofore, in the operation of milking machines, when a milking tube has been made to divide and extend to two or more teats it has been found difficult to ascertain when the milk had ceased to flow from a particular teat. I have provided means whereby when the milk ceases to flow from any teat this fact will be made known, and I have also provided means whereby the tube in which the milk has ceased to flow may be closed independently of the others. To the accomplishment of the first of these ends I have provided a form of forking pipe coupling which is inserted in the flexible milking tube at the point at which said tube divides. In Fig. 12 a form of such connecting means is shown, this device comprising a Y-shaped transparent member, which may be of glass, provided with an outer protecting shield, preferably of aluminum or other light but strong material, the shield being left open along one side so that the passage of milk through the transparent coupling may be observed. The tube leading from the milking machine is attached to the larger portion 72 of the glass structure illustrated in Fig. 12, and to each of the smaller portions 73 is attached a flexible tube leading to one of the cups. The metallic shield 74 prevents accidental breaking of the glass or other transparent material. The form of fork shown in Fig. 12 is intended for use with two teat cups, but in Figs. 13 and 14 I have shown a form in which four milking tubes may be attached to one tube leading from the milking machine. In case it be desired to milk four cows at one time a coupling of this form will be attached to each of the tubes leading from the machine, but in this case the tractive effect would be exerted upon all four teats of a cow at once.

When, in the operation of the device, the milking has proceeded to the point where one of the teats fails to yield more milk, this fact will be indicated by the cessation of the flow of milk through the leg of the glass fork and this tube may then be closed in order to prevent injury to the cow, suitable means for so closing the tube being shown in Figs. 15 and 16. I have found that clips such as shown in these figures have particular advantages, in that they can be opened and closed by the operator by the use of but one hand, thus leaving the other hand free for the purpose of adjusting the devices of the machine. By the pressure of the thumb of the operator upon the plate 75 of the form shown in Fig. 16 the tongues 76 are carried down upon opposite sides of the tube 37 and outwardly projecting lugs on the free ends of the tongues are caused to engage in notches 77 in the plates 78 and the device is thereby locked in the closed position with the bend 79 in the strip of metal forming the body of the device compressing the tube and shutting off the flow of milk or air therethrough. By pressure of the thumb upon the rear portion 80 of the plate 75 the points of the tongues 76 are drawn out of the notches 77 and the device opens. The construction of this clip is such as to permit the gradual application or removal of the pressure upon the tube. This is of advantage as it tends to lessen the liability of the cow to become alarmed or be made nervous, as is the case when force is too suddenly applied or relieved. The clip shown in Fig. 15 is of somewhat different construction from that shown in Fig. 16, but can be opened and closed with one hand.

Heretofore, in the use of milking machines of the type in which the vacuum is periodically reduced, considerable difficulty has been experienced in keeping the cups in position on the teats, because of the fact that when the vacuum is at its lowest value there is not sufficient suction to retain the cup in place. I have improved the cups to overcome this difficulty, and in Figs. 17 and 18 have illustrated embodiments of this part of my invention. The cup 81 is given a tapering form, being made smaller at its lower end, so that the walls thereof will provide means for preventing undue expansion of the teat when vacuum is applied, and the upper end is provided with an inwardly extending rib 82 forming a constricted neck into which the teat is inserted. Upon the application of suction the teat expands and fills the upper part of the cup, and when the suction effect is reduced by the inflow of air into the milk duct, due to the operation of the pulsator, the pressure of the rib is sufficient to hold the cup in place until the suction effect is again applied, as the teat does not immediately contract. I have further improved the cup by providing a wide, comparatively flat surface extending around the upper edge thereof, the advantage of this being that injury to the cow is less likely to occur than would be the case were the thin edge of the metal to come in contact with the udder. This result is accomplished by first bending the material inward to form the bead 82 and then bending the same outward to form a flat upper surface 83, the edge 84 being then rolled in under to form a round smooth bead. A modification of this form of cup is shown in Fig. 18, in which a pneumatic cushion is applied to the upper edge, this cushion comprising a hollow ring 85 of resilient material such as rubber inflated and provided with a downwardly and inwardly projecting flange 86 which locks under the bead 84 of the cup to retain the cushion in place thereon. The lower end of the cup is drawn in to provide a neck 87 for the attachment of the rubber tube.

It is desirable in some cases to keep the milk taken from each cow separate from that of the others, in order that a record of the quantity and quality and other characteristics of the milk of each cow may be made. As milking machines are commonly constructed, if it be desired to keep the milk from each cow separate it has been necessary to milk but one cow at a time, but by the use of a special form of receptacle which I have devised and have illustrated in Figs. 9, 10 and 11, I am enabled to milk two cows at one time and yet keep the milk of each cow separate from that taken from the other. To this end I provide an inner receptacle 88 located preferably in the center of the outer receptacle 15 which carries the cover having mounted thereon the milking mechanism. This inner receptacle is provided with its own cover 89 which may be secured in position so that when the can is tipped to pour the milk from the outer receptacle the milk in the inner receptacle will be retained until its cover is removed. The pipe leading from one pair of pulsators opens into the receptacle above a funnel-shaped spout 90, the lower end of which leads through the wall of the inner receptacle, whereby the milk which flows from these pulsators is directed into the inner receptacle. A second funnel-shaped spout 91 receives the milk from the other pair of pulsators, the lower end of this spout leading into the outer receptacle.

It has been found that from the moment the milk leaves the udder of the cow the bacteria contained in the milk begin to multiply with exceeding rapidity, and in order to destroy this bacteria at the earliest possible time I have provided my milking machine with means for raising the temperature of the milk to a sterilizing temperature immediately after the milk has been drawn from the udder of the cow. To this end I apply means directly to the receptacle of the milking machine for heating the same and its contents to a sufficiently high temperature to pasteurize or sterilize the contents. If desired, other heat supplying means may be applied, either in conjunction with or independently of the above described means, so as to heat the milk on its passage to the receptacle, and I have shown means for accomplishing both of these results. For the purpose of heating the receptacle and its contents I inclose the side walls and bottom of the receptacle in electric heating pads 92 and 93. The current for heating these pads may be supplied from the source of electric power which runs the motor of the milking machine, suitable lead wires 94 and 95 being provided for making connection with the wires of the supply circuit. If desired, the heating pads may be placed within the outer receptacle and surrounding the inner receptacle.

In the modification shown in Fig. 11 the inner and outer receptacles are each constructed with double walls and the heating pads are placed between these walls. The means which are provided for heating the milk during its passage to the receptacle may comprise a coil 96 of resistance wire wound around the spout 91, which coil, when heated by the passage of electricity therethrough, will raise the temperature of the tube spout 91 to a sufficiently high point to heat and sterilize the milk during its passage through said spout.

What I claim as new and desire to secure by Letters Patent, is:

1. The combination of a receptacle, a cover therefor, a pair of double-acting pumps mounted thereon, a crank shaft having a crank corresponding to each pump, a milk duct communicating with said receptacle, means for impressing fluctuations upon the vacuum within said duct, and operative connection between said crank shaft and said fluctuation-impressing means.

2. The combination with a receptacle, of a cover therefor having mounted thereon a member provided with a passage opening at its lower end into said receptacle, the upper end of said passage dividing, a valve chamber to which each of said passages leads, a valve-piece in each of said chambers, means connecting said valve-pieces together and moving said valve-pieces simultaneously, each of said chambers having a relief port and a milk duct leading therefrom and each of said valve-pieces having a passage extending therethrough, one end of which alternately registers with said first-named passage and said relief port and the opposite end of which registers with said milk duct.

3. The combination with a receptacle, of a cover therefor having mounted thereon a member provided with a passage extending therethrough and opening at its lower end into said receptacle, a pair of valve chambers, each of which communicates with said passage, a valve-piece in each of said chambers, means for moving said valve-pieces simultaneously, a milk duct leading from each of said chambers, said chambers having each a vent port and said valve-pieces having each a passage extending therethrough one end of which registers alternately with said first-named passage and a vent port and the other end of which registers with the milk duct, said valve-pieces being so arranged that when the passage of one valve-piece registers with a vent port the passage of the other valve-piece registers with said first-named passage.

4. The combination with a milk receptacle, of a cover therefor, a structure mounted on said cover and provided with a passage opening at its lower end into said receptacle, said structure having a pair of valve chambers communicating with said passage and having each a milk duct leading therefrom, each valve chamber having also a relief port, a valve-piece arranged in each of said chambers, means for imparting a circular movement to said valve-pieces simultaneously, each of said valve-pieces having a passage extending therethrough and arranged to register alternately with said relief port and the passage leading from the receptacle, said valve passage being arranged to register at its opposite end with the milk duct, said valve-pieces being so arranged that when one valve passage registers with a relief port the other valve passage registers with the passage leading from the receptacle.

5. The combination with a milk receptacle, of a cover therefor, a structure mounted thereon having a valve chamber, and a passage opening at its lower end into the receptacle and opening at its other end into said valve chamber, a valve-piece in said valve chamber, extending therethrough, said valve chamber having a relief port and a milk duct leading therefrom, said valve-piece having a single passage extending therethrough and arranged to alternately connect said milk duct with said relief port and with the passage leading to the receptacle.

6. In a milking machine, the combination with a receptacle, of a device for exhausting said receptacle, a milk duct leading to said receptacle, said duct having a vent port, a valve, and means driven by said exhausting device for imparting continuous rotation to said valve, said valve being arranged to shut off communication between said milk duct and said receptacle and simultaneously open said duct to said relief port and thereafter to close said relief port and connect said milk duct with said receptacle.

7. The combination with a receptacle, of a device for exhausting said receptacle, a pair of milk ducts leading from said receptacle, each of said ducts having a relief port, a valve in each of said ducts, said valves being operatively connected together, and means driven by said exhausting device for rotating said valve-pieces continuously, each of said valve-pieces being arranged to open the corresponding relief port and simultaneously shut off communication between its milk duct and said receptacle and thereafter to close said relief port and connect said milk duct with said receptacle.

8. The combination with a receptacle, of means for exhausting said receptacle, a pair of milk ducts leading from said receptacle, each of said ducts having a relief port, a valve in each of said ducts, said valves being operatively connected together, means for rotating said valve-pieces continuously, each of said valve-pieces being arranged to open the corresponding relief port and simultaneously shut off communication between said milk duct and said receptacle and thereafter to close said relief port and connect said milk duct with said receptacle, said valves being so arranged that when one valve is in position to effect the first of said results the other valve piece is in position to effect the second of said results.

9. In a milking machine, the combination with a receptacle, of means for exhausting said receptacle, a milk duct leading to said receptacle, said duct having a relief port, a valve arranged to connect said milk duct alternately with said relief port and said receptacle, and operative connection between said exhausting means and said valve whereby continuous rotation in one direction is imparted to said valve when said exhausting means is in operation.

10. In a milking machine, the combination with a receptacle, of means for exhausting said receptacle, a milk duct leading to said receptacle, a valve arranged to alternately vent said milk duct and connect said milk duct with said receptacle, and operative connection between said exhausting means and said valve for imparting rotation to said valve while said exhausting means is in operation.

11. In a milking machine, the combination with a receptacle, of means for exhausting said receptacle, a milk duct leading to said receptacle, a valve arranged to alternately vent said milk duct and connect said milk duct with said receptacle, and operative connection between said exhausting means and said valve for imparting continuous rotation in one direction to said valve while said exhausting means is in operation.

12. The combination with a receptacle, of means for exhausting said receptacle, a pair of milk ducts leading to said receptacle, a valve for each of said milk ducts so arranged that one of said valves will vent its milk duct and the other valve will simultaneously open its milk duct, and operative connection between said exhausting means and said valves, whereby said valves are continuously rotated during the operation of said exhausting means.

13. The combination with a receptacle, of a pair of milk ducts leading to said receptacle and each having a valve therein arranged to close its duct from said receptacle and vent the same to the atmosphere and thereafter to open said duct to said receptacle and close the vent, and means for operatively connecting said valves to said exhausting means, whereby said valves are revolved and one of said valves is caused to perform one of said operations while the other valve is performing the other operation.

14. The combination with a receptacle, of means for exhausting said receptacle, a duct leading to said receptacle, a valve arranged to open said duct and thereafter close said duct and vent the same, a pulley connected with said valve, means for operating said exhausting means, and a belt transmitting movement from said last-named means to said pulley.

15. The combination with a receptacle, of means for exhausting said receptacle, a rotating shaft transmitting movement to said exhausting means, a milk duct leading to said receptacle, a valve arranged to alternately open and close said duct and to vent said duct when closed, and flexible connections for transmitting movement from said shaft to said valve.

16. The combination with a receptacle, of means for exhausting said receptacle, a milk duct leading thereto, means for imparting fluctuations in the flow through said milk duct, and flexible transmission means between said exhausting means and said valve.

17. The combination with a receptacle, of means for exhausting said receptacle, a revolving shaft for operating said exhausting means, a milk duct leading to said receptacle, a rotary pulsation valve in said milk duct, and flexible connection between said shaft and said valve arranged to impart continuous rotation to said valve.

18. The combination with a receptacle, of means for exhausting said receptacle, a revolving shaft for operating said exhausting means, a milk duct leading to said receptacle, a rotary pulsation valve in said milk duct, and flexible connection between said shaft and said valve arranged to impart movement to said valve.

19. In a milking machine, the combination with a milk receiving receptacle, of a cover therefor having means mounted thereon for milking two cows simultaneously, a second milk receiving receptacle within said first-named receptacle and provided with an independent cover whereby said second named receptacle may be closed to the first named receptacle, and separate milk ducts leading through said first-named cover to said inner and outer receptacles.

20. In a milking machine, the combination, of a receptacle, a wall within said receptacle out of contact with the side walls of said receptacle for dividing said receptacle into two compartments, and an individual cover for each of said compartments.

21. In a milking machine, the combination of a receptacle, a wall within said receptacle out of contact with the side walls of said receptacle for dividing said receptacle into two separate compartments, an individual cover for each of said compartments, milking mechanism adapted to milk a plurality of cows, and means for conducting the milk from each cow into a separate compartment.

22. A milking cup having a restricted neck and a flat comparatively wide bearing surface beyond the neck, terminating in a downwardly curled portion, and a hollow resilient cushion resting upon said flattened portion and having a projecting flange embracing the curled portion to hold the cushion in place upon the bearing surface.

23. A milking cup having a restricted neck and a flat, comparatively wide bearing surface beyond said neck, and a hollow resilient cushion secured to said cup and resting upon said flattened portion.

24. In a milking machine, the combination with a receptacle, of a removable cover therefor, means mounted on said cover for exhausting said receptacle, a plurality of pairs of pulsation valves mounted on said receptacle, and a milk duct controlled by each of said pulsation valves and arranged for the attachment thereto of a milking tube, each of said milking tubes having a portion thereof made transparent and extending at an angle with the horizontal.

25. In a milking machine, the combination with a receptacle, of a removable cover therefor, means mounted on said cover for exhausting said receptacle, a plurality of pairs of pulsation valves mounted on said receptacle, and a milk duct controlled by each of said pulsation valves and arranged for the attachment thereto of a milking tube, each of said milking tubes having a portion thereof made transparent, said transparent portion extending in such a direction as to be self-draining.

26. In a milking machine, the combination with a receptacle divided into compartments, of a removable cover having mounted thereon means for exhausting said receptacle, a plurality of milk ducts each of which opens at one end into one of the compartments of the receptacle, said milk ducts extending at an angle with the horizontal and being each adapted for the attachment thereto of a milking tube, each of said ducts having a portion thereof made transparent, and means for causing fluctuations in the flow through said ducts.

27. In a milking machine, the combination with a receptacle, of a cover therefor, a pump mounted on said cover, a shaft operatively connected with the piston of said pump, a milk duct having a portion thereof made transparent, a valve in said duct, and operative connection between said shaft and the valve piece of said valve, said connection transmitting continuous rotary motion to said valve piece.

In witness whereof, I have hereunto subscribed my name in the presence of two witnesses.

THEODORE UMRATH.

Witnesses:
M. R. ROCHFORD,
CHARLES L. HOPKINS.